United States Patent [19]

Frank et al.

[11] Patent Number: 4,573,692
[45] Date of Patent: Mar. 4, 1986

[54] LIP SEAL WITH ELASTIC ATTACHING BAND

[75] Inventors: Hubertus Frank, Höchstadt; Rainer Gebauer, Bamberg, both of Fed. Rep. of Germany

[73] Assignee: INA Walzlager Schaeffler KG, Fed. Rep. of Germany

[21] Appl. No.: 755,295

[22] Filed: Jul. 15, 1985

[30] Foreign Application Priority Data

Jul. 20, 1984 [DE] Fed. Rep. of Germany ....... 3426805

[51] Int. Cl.⁴ ............................................... F16J 15/32
[52] U.S. Cl. .................................... 277/152; 277/101; 277/166
[58] Field of Search .................. 277/25, 95, 65, 82, 277/84, 93 R, 101, 166, 152, 153

[56] References Cited

U.S. PATENT DOCUMENTS

| | | | |
|---|---|---|---|
| 1,487,624 | 3/1924 | Tollefson et al. | 277/101 X |
| 2,639,954 | 5/1953 | Potter | 277/95 X |
| 2,806,719 | 9/1957 | Ohlstrom | 277/101 |
| 2,908,536 | 10/1959 | Dickey | 277/25 X |
| 3,700,296 | 10/1972 | Bugmann | 277/95 X |

FOREIGN PATENT DOCUMENTS 1957470  5/1973  Fed. Rep. of Germany ........ 277/25

Primary Examiner—Robert S. Ward
Attorney, Agent, or Firm—Bierman, Peroff & Muserlian

[57] ABSTRACT

A seal assembly for sealing between two elements, at least one of the elements having a cylindrical surface supporting a seal made of an elastic material provided with a sealing lip bearing against the second element, the improvement comprising that the seal consists of a hollow-cylindrical body from which a sealing lip projects from at least one face and the body bears against the cylindrical surface of the one element and is encircled by an elastic band of polymeric material to hold the body in place.

10 Claims, 5 Drawing Figures

LIP SEAL WITH ELASTIC ATTACHING BAND

STATE OF THE ART

Seal assemblies for sealing two elements moveable with respect to each other and stationary to each other are known. U.S. Pat. No. 2,415,888 describes a seal assembly of this type wherein the seal is of an annular design and its inside diameter is secured to a protective ring by vulcanizing. The seal is press fitted by means of the protective ring to the cylindrical surface of the element supporting it. While this seal assembly operates quite satisfactorily, the expense of such an assembly is high due to protective ring expense and the additional manufacturing steps required to join the actual seal to the protective ring. Moreover, different seal assemblies are required to seal different diameters which requires additional expense for tools and inventory.

OBJECTS OF THE INVENTION

It is an object of the invention to provide a novel inexpensive seal assembly for sealing two elements, one of which has a cylindrical surface which supports the seal made of an elastic material, preferably a polymeric material, and provided with a sealing lip bearing against the second element.

This and other objects and advantages of the invention will become obvious from the following detailed description.

THE INVENTION

The novel seal assembly of the invention for sealing between two elements, at least one of the elements having a cylindrical surface supporting a seal made of an elastic material provided with a sealing lip bearing against the second element, is characterized in that the seal consists of a hollow-cylindrical body from which a sealing lip projects from at least one face and the body bears against the cylindrical surface of the one element and is encircled by an elastic band of polymeric material to hold the body in place.

Because the seal assembly has a seal with a hollow-cylindrical body or base from which a sealing lip projects from at least one face, the seal can be securely fastened to the structural element supporting it by a band encircling the body like a bandage without the expense due to the prior art protective ring. In one embodiment of the invention, the encircling band is reinforced with fibers, especially fibers oriented in the lengthwise direction of the band. Preferred fibers are fiber glass filaments with a length corresponding to the band length.

In another embodiment of the invention, the ends of the band encircling the support are welded together which obviates the necessity of maintaining an inventory of bands of varying diameters because the band for seal assemblies of different diameters may be merely cut to the desired length and its ends are welded together. In a further embodiment of the invention, the band may be spirally wound around the body in several layers which permits a relatively thin band to be used. Such a band may also be provided with an adhesive film on its side facing the body to ensure adhesion of the band to the body or the individual layers of the band to each other and to maintain the band tension.

In other variations of the assembly of the invention, at least the outer layers of the band to be interconnected can be secured at least at one circumferential point material wise by a spot weld or held positively by a fastening means such as a clip. These measures act to maintain the band tension as well as to secure the position of the various band layers relative to one another.

To ensure exact positioning of the seal on the element supporting it during assembly of the seal assembly, one embodiment of the invention provides circumferential projections and recesses for the inner diameter of the body and the cylindrical outer diameter of the first element for mutual positive engagement.

Depending upon the cross-sectional shape of the seal, the band in one embodiment of the invention is formed by a portion of a profile with a cross section corresponding to that of the seal and its ends are joined together by cementing or vulcanizing. In this instance, the seal is produced as an extruded profile, cut to the length required for the specific seal assembly and its ends are joined so that it is unnecessary to produce different seal assemblies for each diameter.

Referring now to the drawings

Figure 1:
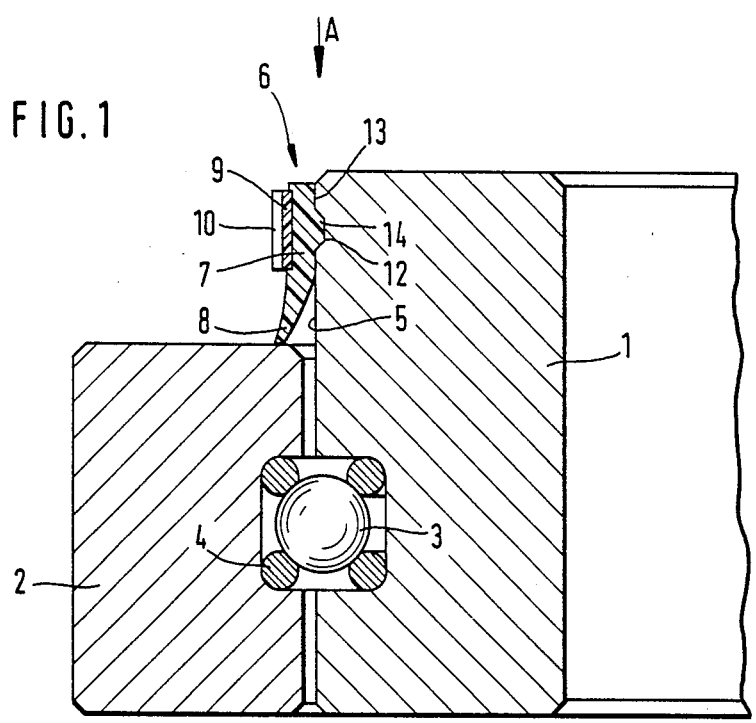
FIG. 1 is a partial longitudinal cross-section of a roller bearing rotary connection provided with a seal assembly of the invention taken along line I—I of FIG. 2
Figure 2:
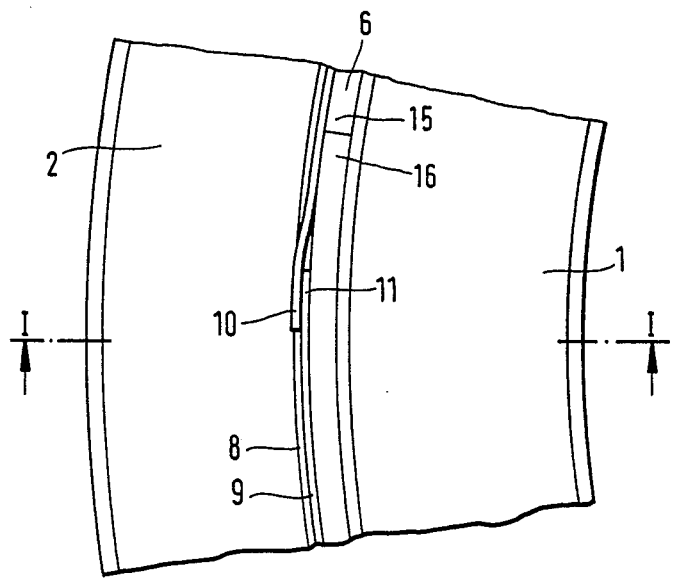
FIG. 2 is a partial view according to arrow A of FIG. 1.

The seal assembly illustrated in FIG. 1 is disposed between mutually concentric races 1 and 2 of a roller bearing rotary connection, between which balls 3 roll along wires 4. Inner race 1 of the rotary connection has a cylindrical surface 5 which supports a seal 6 consisting of a hollow-cylindrical body 7 and a sealing lip 8 which projects from a face of the body 7 and bears against the outer race. Body 7 of seal 6 is encircled by an elastic band 9 made of a polymeric material and whose ends 10 overlap as shown in FIG. 2. The mutually facing surfaces of the ends 10 and 11 are welded together.

To assure exact positioning of seal 6 on inner race 1 when assembling the seal assembly, inner race 1 has a recess 12 which extends over its entire circumference and is engaged by a matching projection 14 of seal 6 provided in the inside diameter 13 of body 7. The seal 6 consists of a portion of a profile whose cross section corresponds to that of the seal 6 and whose ends 15 and 16 are interconnected material-wise by cementing or vulcanizing which obviates the necessity of producing specific seals 6 for seal assemblies of different diameters. Instead, they can be cut off the profile in the respectively required length and joined at their ends in the manner described.

Figure 3:
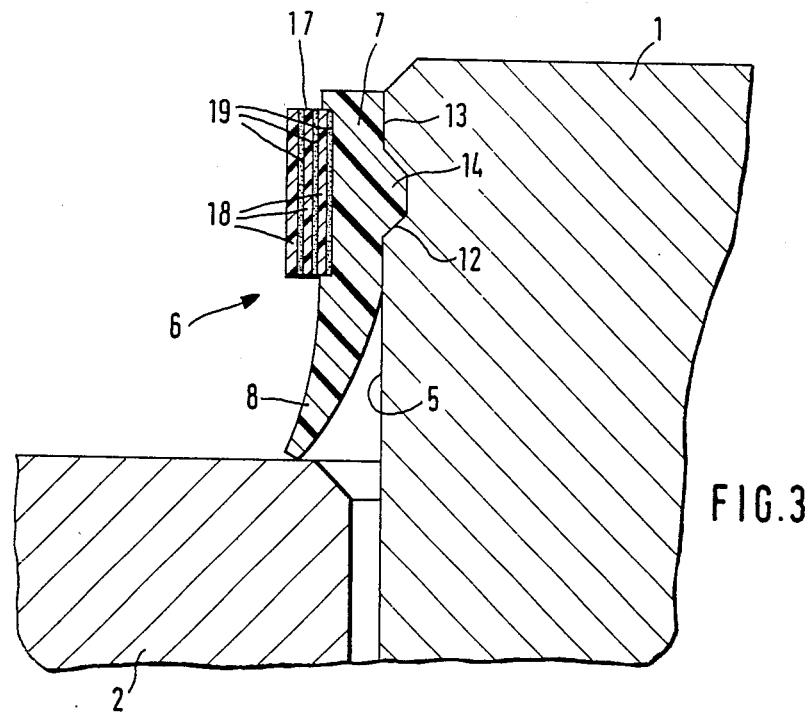
FIGS. 3 to 5 are enlarged, partial longitudinal cross-sectional views of rotary connections provided with different embodiments of seal assemblies of the invention.
Figure 4:
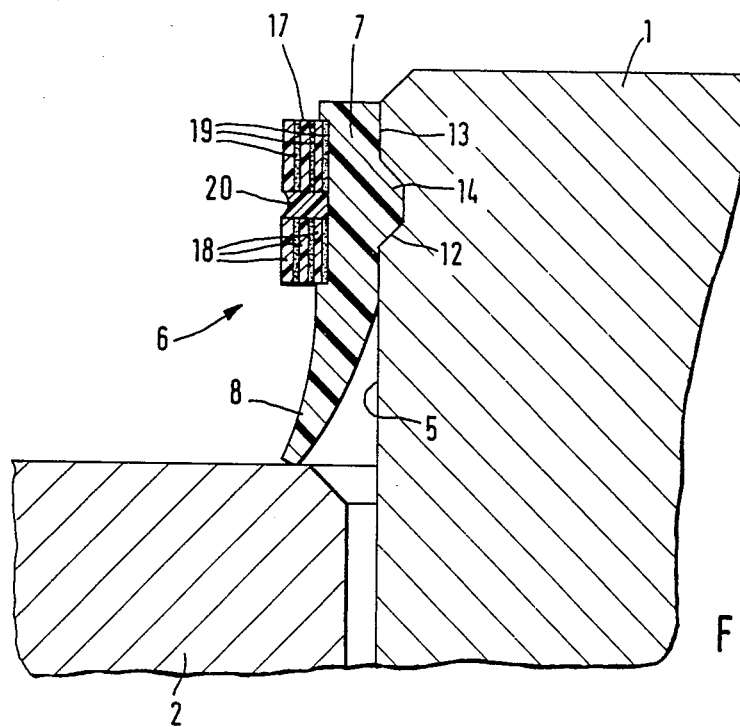
Figure 5:
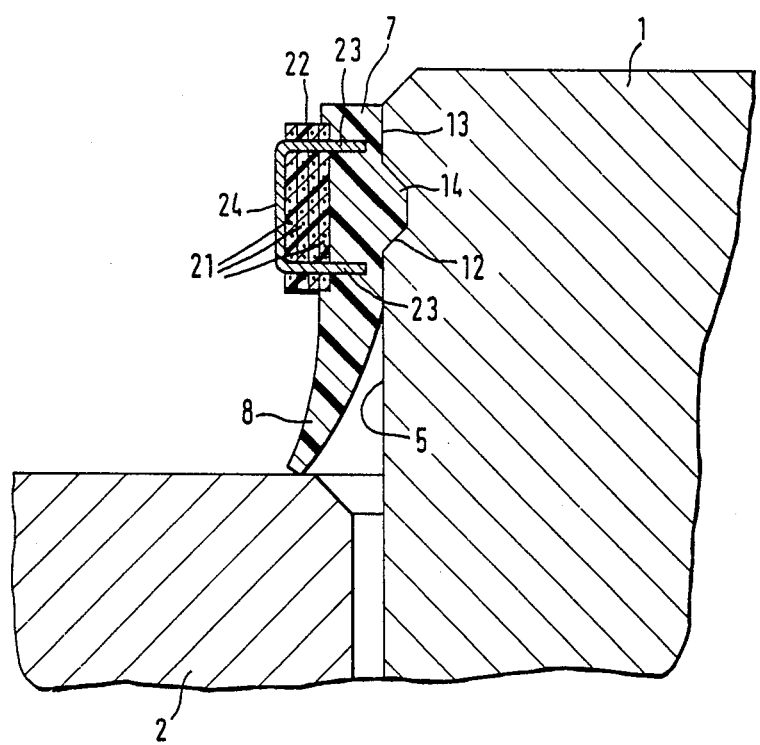

The seal assemblies of the invention illustrated in FIGS. 3 to 5 differ from those described in FIGS. 1 and 2 in that the band 17 or 22 made of polymeric material is spirally wound in several layers 18 or 21, respectively, around the hollow-cylindrical body 7. In the embodiment shown in FIG. 3, an adhesive film 19 is provided on the side of band 17 facing body 7 serving to secure band 17 overall on body 7 and the individual layers 18 of band 17 relative to each other. On the other hand, adhesive film 19 also serves to maintain the tension of band 17.

In the embodiment of FIG. 4, spot welding 20 is provided additionally, which applies to all layers 18 of the tape 17 and forms an connection between them that ensures additionally the maintenance of the tension of tape 17. The spot welding 20 can be produced in a simple manner by means of a pin-type, heated tool that is pressed with its face part against the tape 17.

FIG. 5 shows an embodiment in which all layers of band 22 are penetrated by the legs 23 of a U-shaped clip 24, said legs also penetrating partly the body 7 to secure the position of band 22 on body 7 as well as the position of the individual layers 21 of band 22 relative to each other by positive connection and assures at the same time the tension of band 22. As may be seen from the shading in FIG. 5, the band 22 is reinforced by fiber glass filaments running in lengthwise direction of band 22.

Various modifications of the seal assembly of the invention may be made without departing from the spirit or scope thereof and it is to be understood that the invention is intended to be limited only as defined in the appended claims.

What we claim is:

1. A seal assembly for sealing between two elements, at least one of the elements having a cylindrical surface supporting a seal made of an elastic material provided with a sealing lip bearing against the second element, the improvement comprising that the seal consists of a hollow-cylindrical body from which a sealing lip projects from at least one face and the body bears against the cylindrical surface of the one element and is encircled by an elastic band of polymeric material to hold the body in place.

2. The seal assembly of claim 1 wherein the band encircling the body is fiber reinforced.

3. The seal assembly of claim 2 wherein the fibers are oriented in the lengthwise direction of the band.

4. The seal assembly of claim 1 wherein the ends of the band encircling the support are welded together.

5. The seal assembly of claim 1 wherein the band is spirally wound about the body several layers.

6. The seal assembly of claim 5 wherein the band is provided with an adensive film on its side facing the body.

7. The seal assembly of claim 5 wherein the outer layers of the band are interconnected by a spot weld at least at one circumferential point.

8. The seal assembly of claim 5 wherein at least the outer layers of the band are connected positively by a fastening means at one circumferential point.

9. The seal assembly of claim 1 wherein the inside diameter of the body and the cylindrical surface of the element are provided with circumferential projections and recesses for mutual engagement.

10. The seal assembly of claim 1 wherein the seal is form by a portion of a profile whose cross section corresponds to that of the seal and whose ends are joined together by cementing or vulcanizing.

* * * * *